(12) United States Patent
Wilby

(10) Patent No.: US 10,006,997 B2
(45) Date of Patent: Jun. 26, 2018

(54) LASER SYNTHETIC APERTURE SONAR FOR BURIED OBJECT DETECTION

(71) Applicant: RAYTHEON COMPANY, Waltham, MA (US)

(72) Inventor: Andrew D. Wilby, Portsmouth, RI (US)

(73) Assignee: RAYTHEON COMPANY, Waltham, MA (US)

( * ) Notice: Subject to any disclaimer, the term of this patent is extended or adjusted under 35 U.S.C. 154(b) by 625 days.

(21) Appl. No.: 14/633,836

(22) Filed: Feb. 27, 2015

(65) Prior Publication Data

US 2016/0252616 A1    Sep. 1, 2016

(51) Int. Cl.

| | |
|---|---|
| *G01S 15/89* | (2006.01) |
| *G01S 15/02* | (2006.01) |
| *G01S 17/58* | (2006.01) |
| *G01S 17/87* | (2006.01) |
| *G01S 17/89* | (2006.01) |
| *G01S 7/48* | (2006.01) |
| *G01S 7/481* | (2006.01) |

(52) U.S. Cl.
CPC ............ *G01S 15/89* (2013.01); *G01S 7/4808* (2013.01); *G01S 7/4815* (2013.01); *G01S 15/025* (2013.01); *G01S 17/58* (2013.01); *G01S 17/87* (2013.01); *G01S 17/895* (2013.01); *G01S 7/4817* (2013.01)

(58) Field of Classification Search
CPC ................ G01H 9/002; G01B 9/02019; G01B 9/02045; G01B 9/02027; G01B 9/02002; G01B 9/02023; G01B 2290/70
See application file for complete search history.

(56) References Cited

U.S. PATENT DOCUMENTS 8,797,828 B1 *   8/2014   Lev .................... G01V 8/00
                                                    356/486

OTHER PUBLICATIONS

Aranchuk et al., "Multi-beam laser Doppler vibrometry for acoustic landmine detection using airborne and mechanically-coupled vibration", In Defense and Security, International Society for Optics and Photonics, Jun. 2005, pp. 1-7. (Year: 2005).*

(Continued)

*Primary Examiner* — Luke D Ratcliffe
(74) *Attorney, Agent, or Firm* — Cantor Colburn LLP

(57) ABSTRACT

A system and method to detect an object buried beneath the seabed are described. The system includes a moving platform, a low frequency signal source coupled to the platform to transmit a low frequency signal to an area of the seabed, and a laser Doppler vibrometer (LDV) coupled to the platform to transmit a plurality of transmission beams to the area of the seabed at a respective plurality of angles at each position of a plurality of positions of the platform over the area. The LDV includes a plurality of receivers that receive a respective plurality of reflection beams resulting from the plurality of transmission beams. A processor develops a three-dimensional image that indicates the object, the processor determining a reflection value at each point of the three-dimensional image as a coherent combination of reflection from the point contributing to each of the plurality of reflection beams.

16 Claims, 6 Drawing Sheets

(56) References Cited

OTHER PUBLICATIONS

Aranchuk et al., "Multi-beam laser Doppler vibrometry for acoustic landmine detection using airborne and mechanically-coupled vibration", In Defense and Security, International Society for Optics and Photonics, Jun. 2005, pp. 1-7.

* cited by examiner

LASER SYNTHETIC APERTURE SONAR FOR BURIED OBJECT DETECTION

BACKGROUND

The present disclosure relates to buried object detection.

Detection of buried objects refers to detection of objects such as, for example, landmines or other items that are obscured from visual detection. One prior approach to landmine detection has involved the introduction of low frequency signals into the ground to cause vibrations. The low frequency signals produce different surface vibrations in areas where there are sub-surface objects (e.g., landmines) present. Thus, this difference in the surface vibration is used to detect landmines. This surface vibration is detected using a laser vibrometer (also referred to as a laser Doppler vibrometer or LDV) that transmits a laser beam and determines vibration based on a Doppler shift in the reflected laser beam.

SUMMARY

According to an embodiment, a buried object detection system configured to detect an object buried beneath a seabed includes a moving platform; a low frequency signal source coupled to the platform and configured to transmit a low frequency signal to an area of the seabed at each position of a plurality of positions of the platform; a multi-beam laser Doppler vibrometer (LDV) coupled to the platform and configured to transmit a plurality of transmission beams to the area of the seabed at a respective plurality of angles at each position of the plurality of positions of the platform over the area, the LDV comprising a plurality of receivers that receive a respective plurality of reflection beams resulting from the plurality of transmission beams; and a processor configured to process the plurality of reflection beams to develop a three-dimensional image that indicates the object, the processor determining a reflection value at each point of the three-dimensional image as a coherent combination of reflections from the point contributing to each of the plurality of reflection beams.

According to another embodiment, a method of detecting an object buried beneath a seabed includes arranging a system to move above an area of the seabed, the system comprising a platform coupled to a low frequency signal source transmitting a low frequency signal to the area of the seabed at each position of a plurality of positions of the platform and a laser Doppler vibrometer (LDV); transmitting, using the LDV, a plurality of transmission beams to the area of the seabed at a respective plurality of angles at each position of the plurality of positions of the platform over the area; collecting a respective plurality of reflection beams resulting from the plurality of transmission beams; processing the plurality of reflection beams and developing a three-dimensional image of the area based on determining a reflection value at each point of the three-dimensional image as a coherent combination of reflections from the point contributing to each of the plurality of reflection beams; and identifying the object based on the three-dimensional image.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As noted above, detection of sub-surface objects has employed a low frequency source and a vibrometer that facilitates determining which areas of the surface experience different vibrations based on the low frequency source because of a buried object. This approach can be effective in the detection of objects that are buried just below the surface (on the order of centimeters below the surface) of the earth. However, detection by this method or other conventional landmine detection methods becomes ineffective when the object is buried below the seabed. In the underwater environment, soft sediment may cause self-burial or movement of a buried object to a greater depth. Thus, an underwater mine may be buried several meters below the seabed, for example, or a sunken black box from a plane crash may become increasingly embedded over time. Embodiments of the systems and methods detailed herein relate to buried object detection in the subsea environment. The embodiments described herein relate to obtaining a high resolution three-dimensional image of the sub-seabed.

Figure 1:
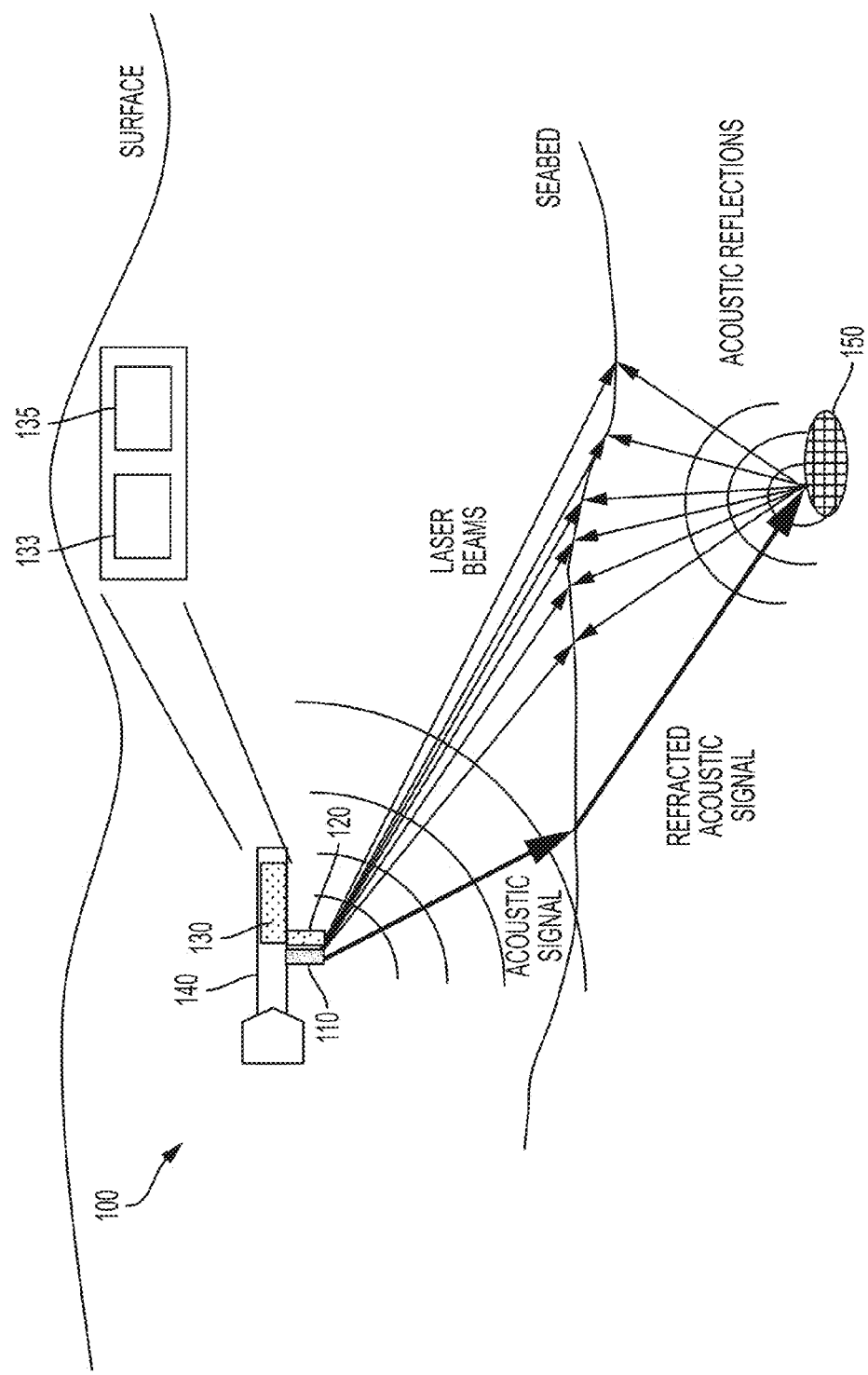
FIG. 1 depicts a buried object detection system according to an embodiment of the invention.

FIG. 1 depicts a buried object detection system 100 according to an embodiment of the invention. The system 100 includes a low frequency signal source 110, one or more vibrometers 120, and a processing system 130 supported by a movable platform 140. The processing system 130 includes one or more memory devices 133 to store information and instructions and one or more processors 135 to implement the instructions. The processing system 130 may include other known components such as input and output interfaces and other communication components. According to one embodiment, the processing system 130 may perform the processing of beams received by the vibrometer 120. In alternate embodiments, the processing system 130 may transmit the received beams or related information for processing at the surface or elsewhere. While one platform 140 is shown in FIG. 1, alternate embodiments of the buried object detection system 100 may include multiple such platforms 140.

Based on movement of the one or more platforms 140 through the water via any known mechanisms, the system 100 detects sub-seabed objects 150. The platform 140 may move at a controllable speed that is, for example, 4 knots. The low frequency signal source 110 may be a transducer that transmits a signal with a frequency between 1 and 10 kilohertz (kHz), for example, to generate vibrations at the seabed surface from below the seabed. As shown in FIG. 1, for example, the low frequency signal source 110 transmits an acoustic signal that causes acoustic reflections to scatter in all directions. Some of these acoustic reflections manifest as vibrations in the seabed. These vibrations are measured based on the laser beams transmitted by the vibrometer 120. The low frequency signal or acoustic signal transmitted by the low frequency signal source is at a higher frequency than the low frequency signal (on the order of Hz) that is typically used for landmine detection. The basic operation of the vibrometer 120 is known, and an overview is provided below with reference to FIG. 2. Modifications of this basic use are then discussed further below. The vibrometer 120 may include a helium-neon laser, laser diode, fiber laser or neodymium-doped yttrium aluminum garnet (Nd: $Y_3Al_5O_{12}$) laser, for example.

Figure 2:
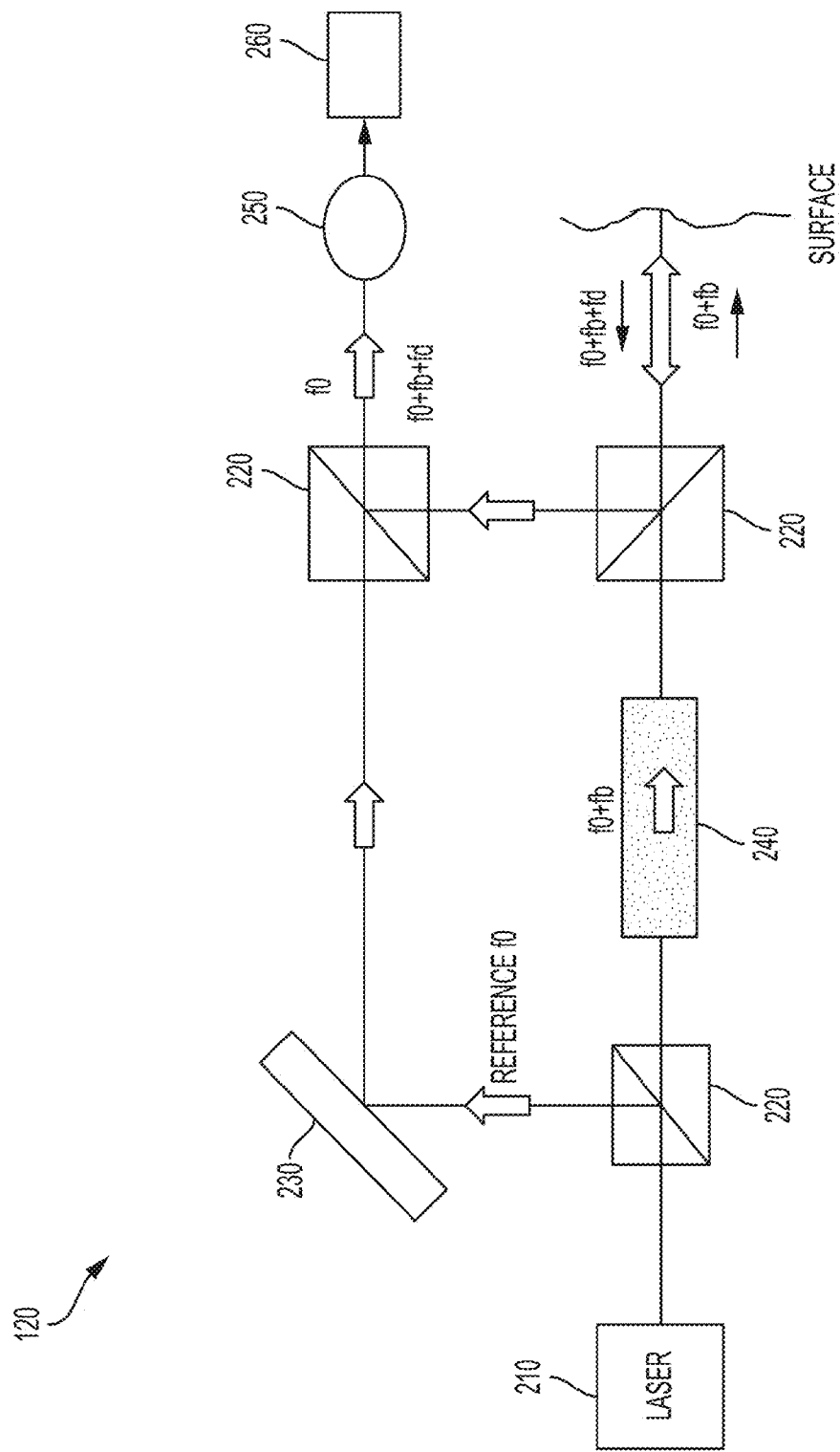
FIG. 2 is a block diagram of an exemplary vibrometer used in the system according to an embodiment.

FIG. 2 is a block diagram of an exemplary vibrometer 120 used in the system 100 according to an embodiment. One transmitted beam is discussed with regard to the exemplary vibrometer 120 shown in FIG. 2. The vibrometer 120 includes a laser 210 that generates a beam at frequency f0. The beam at frequency f0 is split by a beam splitter 220 and directed to a mirror 230 and a Bragg cell 240 that adds a frequency shift to the beam from the beam splitter 220 to output a shifted beam at a frequency of f0+fb. The frequency shift may instead be produced by an acousto-optic modulator, for example. This shifted beam at frequency f0+fb is directed to the surface or sea surface. Because of the vibration of the surface or sea surface due to the low frequency signal source 110, a Doppler shift is added to the shifted beam. Some of the light energy scattered by the surface or sea surface is captured by the vibrometer 120, and this light has a frequency of f0+fb+fd. The captured light is directed by a beam splitter 220 to a photodetector 250 where it is combined with the reference beam at frequency f0. The photodetector outputs a frequency modulated signal with the shift frequency fb as the carrier frequency and the Doppler shift as the modulation frequency (fd). Demodulation of this photodetector signal by a processor 260 provides a signal indicating velocity over time of the vibrating surface or sea surface. From this velocity versus time signal, the amplitude and frequency of vibration of the surface or sea surface may be determined and used to detect the object 150. While a single beam (at frequency f0) is discussed as being transmitted by the exemplary vibrometer 120 with reference to FIG. 2 for explanatory purposes, FIG. 1 clarifies that multiple beams are transmitted at multiple angles. This is detailed with reference to FIG. 3, below, which indicates multiple transmitters 122 in the vibrometer 120. Further, as detailed with reference to FIGS. 3 and 4 below, the transmitted beams may be swept within a single scan based on the movement of a mirror that changes the angle of the incident laser beam. The vibrometer 120 according to embodiments detailed below facilitates beamforming into the seabed to detect a shape of a buried object and, thereby, differentiate man-made objects from natural formations, for example.

Figure 3:
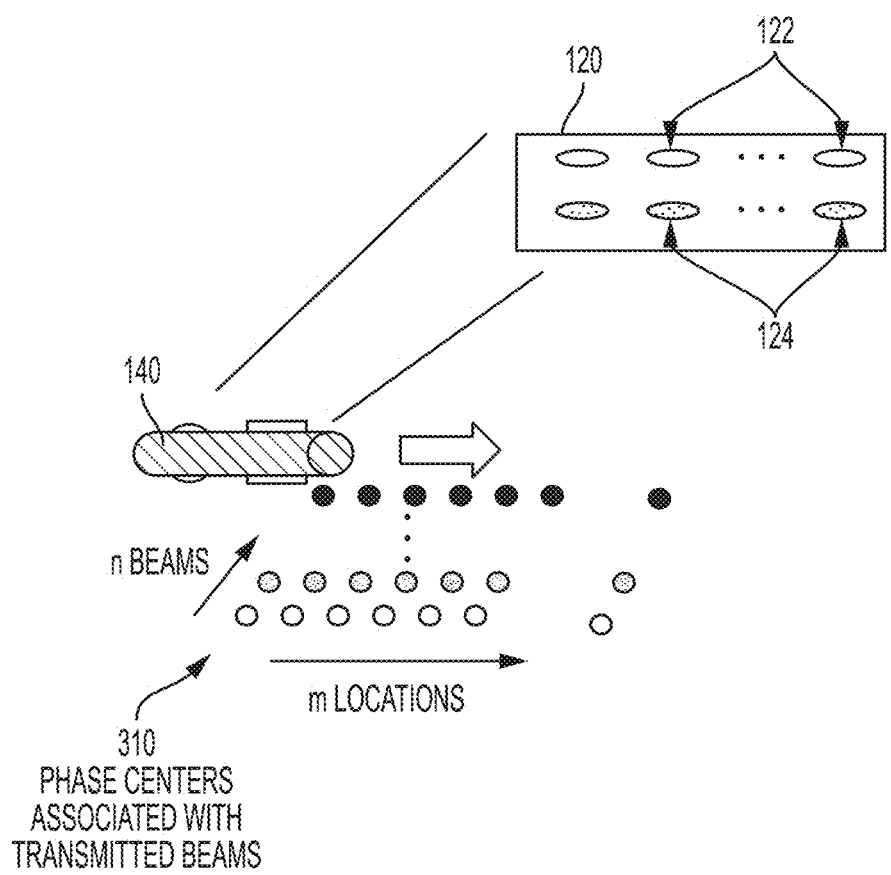
FIG. 3 illustrates exemplary phase centers of vibrometer reflection sources associated with one output of the low frequency signal source according to an embodiment.

FIG. 3 illustrates exemplary phase centers 310 of vibrometer 120 reflection sources associated with one output of the low frequency signal source 110 according to an embodiment. The reflection sources refer to points on the seabed from which reflections are received as a result of the incident beams transmitted by the vibrometer 120. As noted above, these reflection beams received at the vibrometer 120 provide an indication of the vibration caused by the low frequency signal source 100. While FIG. 2 indicates the basic theory of operation of a single-beam vibrometer 120, FIG. 3 illustrates the basic coverage of one multi-beam laser Doppler vibrometer 120. As noted above and shown in FIG. 1, multiple beams (n beams, according to the example shown in FIG. 3) are transmitted by the vibrometer 120 at different angles. This transmission is done by (n) multiple transmitters 122 of the vibrometer 120, and the reflected signals are received by multiple receivers 124 of the vibrometer 120. Each transmitted beam has a different phase center 310 associated with it, as indicated in FIG. 3. In the example shown in FIG. 3, the vibrometer 120 may measure 16 points (n=16) on the seabed simultaneously, to provide an excess of 20 kilo Hertz (kHz) of bandwidth. As shown in the exemplary embodiment of FIG. 3, the n beams are transmitted at angles that are perpendicular to the direction of movement indicated for the platform 140. Each of the n beams transmitted by the n transmitters 122 of the vibrometer 120 are "spread" to m different locations on the seabed based on changing the angle of a mirror that focuses the incident beam output by each transmitter 122. Thus, for one ping or transmission by the low frequency signal source 110, a set of n-by-m phase centers 310 is generated by one multi-beam vibrometer 120. As explained with reference to FIG. 4 below, multiple vibrometers 120 may be used to generate multiple sets of n-by-m phase centers 310 (reflection sources) to increase the area of the seabed investigated with each ping or transmission of the low frequency signal source 110. As shown in the exemplary embodiment of FIG. 3, the m beams associated with each of the n beams are generated in a direction that is parallel with the direction of movement indicated for the platform 140.

Figure 4:
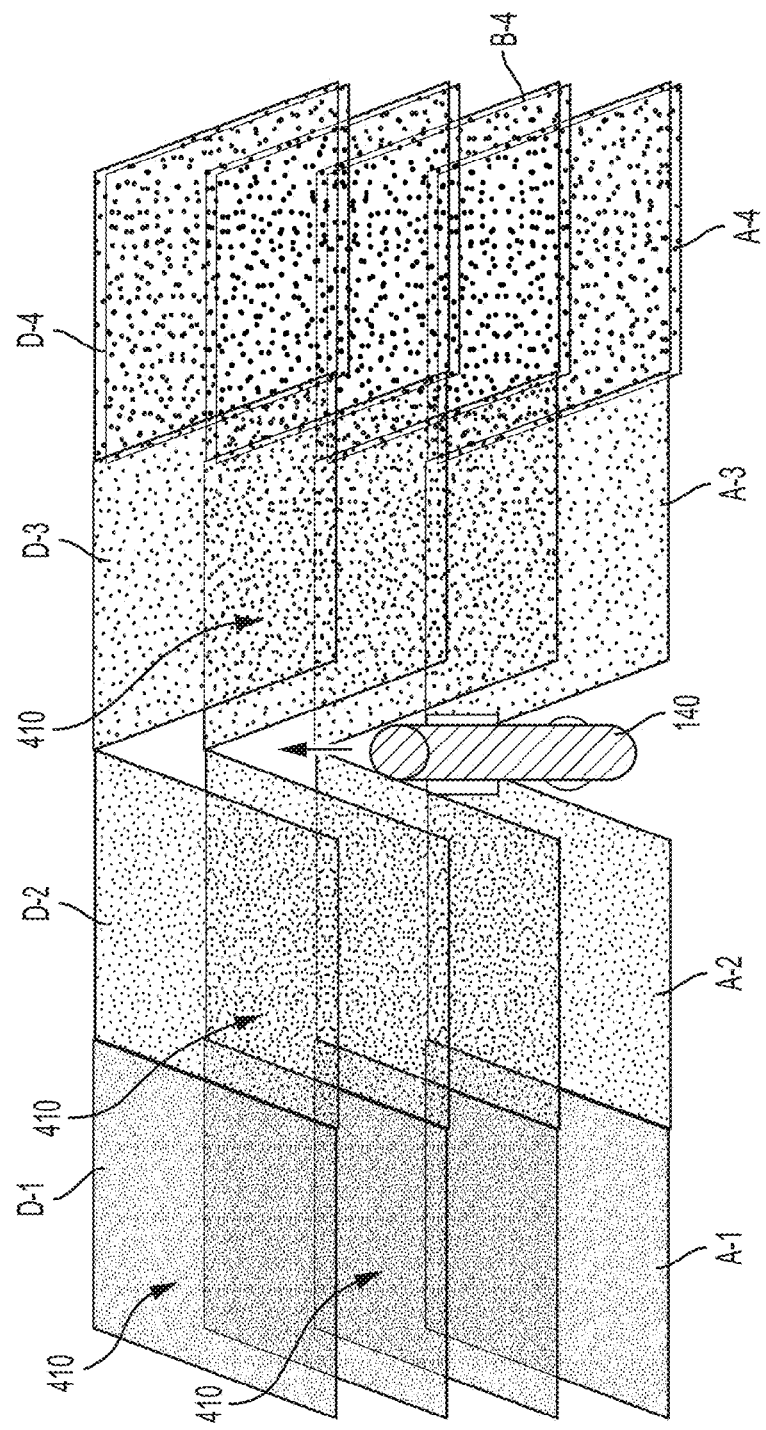
FIG. 4 illustrates the coverage area resulting from each vibrometer for each ping by the low frequency signal source according to an exemplary embodiment of the invention.

FIG. 4 illustrates the coverage area 410 resulting from each vibrometer 120 for each ping by the low frequency signal source 110 according to an exemplary embodiment of the invention. FIG. 4 provides a top-down view from the surface to the seabed. As shown in FIG. 3, for each transmission by the low frequency signal source 110, each vibrometer 120 transmits (n) multiple beams that are moved to (m) multiple locations, resulting in the n-by-m phase centers 310 or reflection points. These n-by-m phase centers 310 are illustrated as a parallelogram indicating the coverage area 410 of one multi-beam vibrometer 120 for a given transmission of the low frequency signal source 110. The exemplary embodiment shown in FIG. 4 involves multiple (four) vibrometers 120 on the platform 140 that each generate a coverage area 410 for each transmission by the low frequency signal source 110. For example, at the first position or location of the platform 140, the low frequency signal source 110 transmits an acoustic signal into the seabed, and each of the four exemplary vibrometers 120 transmit n beams that are moved to m positions, thereby generating reflections from coverage areas 410 A-1, A-2, A-3, A-4. At the fourth (last shown) position of the platform 140, the low frequency signal source 110 transmits another (the fourth) signal and the four vibrometers 120 transmit beams to generate reflections from coverage areas 410 D-1, D-2, D-3, D-4. Because the parallelograms illustrating coverage areas 410 at adjacent locations of the platform 140 overlap (e.g., coverage area A-4 overlaps partially with coverage area B-4), determination of the direction of travel of the platform 140 is aided. That is, if the system 100 produced discrete coverage areas at each position of the platform 140 (as in FIG. 3), determining the location of one coverage area 410 relative to the previous (non-overlapping) coverage area 410 would require some way to track the movement of the platform 140. Based on the beamforming technique at each location of the platform 140 according to embodiments of the invention (and the resulting overlapping coverage areas 410), the location of one coverage area 410 relative to the previous coverage area 410 is resolved by identifying peaks in the cross correlation of data from successive transmissions to establish the exact forward motion of the platform 140. Accurate determination of the movement and, accordingly, the location of reflections received by the vibrometers 120 coupled to the platform 140 facilitates accurate location of any buried objects 150 identified by the system 100. As FIG. 4 illustrates, the movement of the platform 140 facilitates each vibrometer 120 receiving reflections equivalent to a long array of vibrometers 120 (e.g., one vibrometer 120 obtains reflections from coverage areas 410 A-1 through D-1). The coverage areas 410 shown in FIG. 4 on either side of the platform 140 (e.g., A-3 and A-4) may cover 25 meters, for example, such that in a single pass (at a single position of the platform 140 with a single transmission by the low frequency signal source 110), a 50 meter span may be covered by the four vibrometers 120 considered in the exemplary embodiment shown in FIG. 4.

As noted above, at each position of the platform 140 where the low frequency signal source 110 transmits an acoustic signal, (n) multiple beams are transmitted by each vibrometer 120, coupled with the movement of each beam to m locations to result in an n-by-m coverage area 410 of reflection points (reflecting the incident beams by each vibrometer 120). As discussed below, the resulting reflections measured by each of the vibrometers 120 are processed by the processing system 130 or another processor to provide a three-dimensional image that facilitates identification of a buried object 150. Each (laser) beam that is transmitted at the seabed by the vibrometer 120 causes a reflection (laser) beam to be received by the vibrometer 120. Each reflected (laser) beam indicates vibrational energy at a given point (associated phase center) on the seabed surface but that vibrational energy can have contributions from a number of acoustic reflections below the seabed. The ultimate image obtained with the vibrometers 120 is improved if as much of the acoustic reflection as possible from each point at or below the seabed is captured as explained below. Based on the fact that the acoustic reflections travel at the speed of sound, the time delay of the acoustic reflection indicates the depth of the reflection source. As discussed below, the time delay information and coherent combinations of different reflected laser beams using phase rotations facilitates the generation of a high resolution three-dimensional image at and below the seabed surface.

The reflections associated with the same point at or below the seabed, but received at different receivers 124 within the vibrometer 120, are coherently summed. That is, a receiver 124 associated with a transmitter 122 that transmits a beam to a given point on the seabed receives a reflected (laser) beam. Based on the time delay (relative to the transmission of the low frequency signal by the low frequency signal source 110), this reflected (laser) beam indicates that the acoustic reflection originates from some depth below the seabed. In addition, by performing a corresponding phase rotation on reflected (laser) beams received by other receivers 124, the contribution of acoustic reflections or scatter from that same depth to reflected (laser) beams received by those other receivers 124 can be coherently combined. For example, with reference to the coverage areas 410 shown in FIG. 4, the system 100 would generate a three-dimensional image based on the area covered by all of the individual coverage areas 410 and that three-dimensional image would benefit from coherent combinations associated with each of the phase centers 310 of all the coverage areas 410. This coherent combination of the (laser) reflections associated with energy generated by acoustic reflections at every given point at or below the seabed (i.e., associated with each n-by-m coverage area 410) and received based on the multiple beams and the multiple locations of the vibrometer 120 provides a three-dimensional image with an enhanced resolution that facilitates detection of an object 150 that is below the seabed by a distance on the order of meters. The resolution obtained by the coherent combination may be on the order of 10 centimeters, for example.

Figure 5:
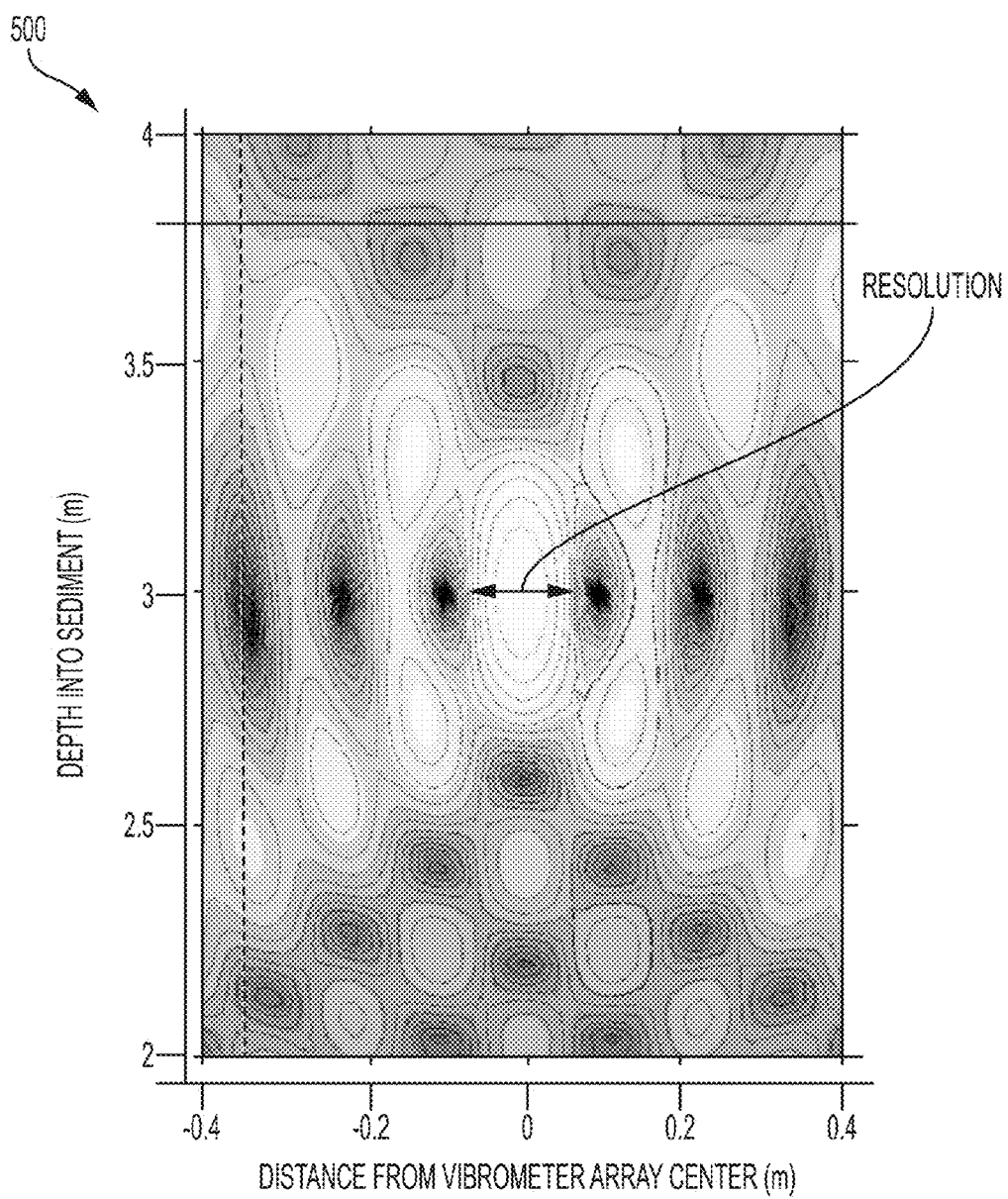
FIG. 5 illustrates a contour plot of the resultant image resolution obtained from a system according to embodiments described herein.

FIG. 5 illustrates a contour plot 500 of the resultant image resolution obtained from a system 100 according to embodiments described herein. The plot 500 is a slice through the seabed (a two-dimensional cross-section of the three-dimensional image obtained by the system 100). Specifically, for a given position of the platform 140, the 3 decibel (dB) contour lines of energy focus within the seabed are shown for different positions perpendicular to the direction of travel of the platform 140 (as shown in FIG. 4, for example). The plot 500 illustrates the ability of the system 100 to focus a two dimensional array of phase center returns to a specific point within the seabed and demonstrates the ability to provide resolution in all three axes. Considering the coverage areas 410 shown in FIG. 4, for example, if the direction of the multiple beams (i.e., direction of coverages areas A-1 through A-4, which is perpendicular to the direction of travel shown for the platform 140) were considered as being along the x axis, the direction of the multiple platform positions (i.e., direction of coverages areas A-1 through D-1) were considered as being along the y-axis, and the direction from the seabed into the sub-seabed surface were considered as being along the z-axis, then the plot 500 shows a two-dimensional slice at a given value of y along the x and z axes. The three-dimensional image resulting from the coherently combined (laser) reflections is of higher resolution than without the combination, because the resulting image benefits from a larger (synthetic) aperture than the actual aperture of a given vibrometer 120. The three-dimensional image may then be used to detect the presence of a buried object 150. In the exemplary plot 500 shown in FIG. 5, the contours indicate that an object approximating the outline of a rectangular shape is 3 meters below the sediment (along the z axis) at a position just below the vibrometer 120 array of the platform 140 (on the x axis) at whatever position of the platform (along the y axis) the slice is taken. The width of the contour outline indicates a 10 cm resolution.

Figure 6:
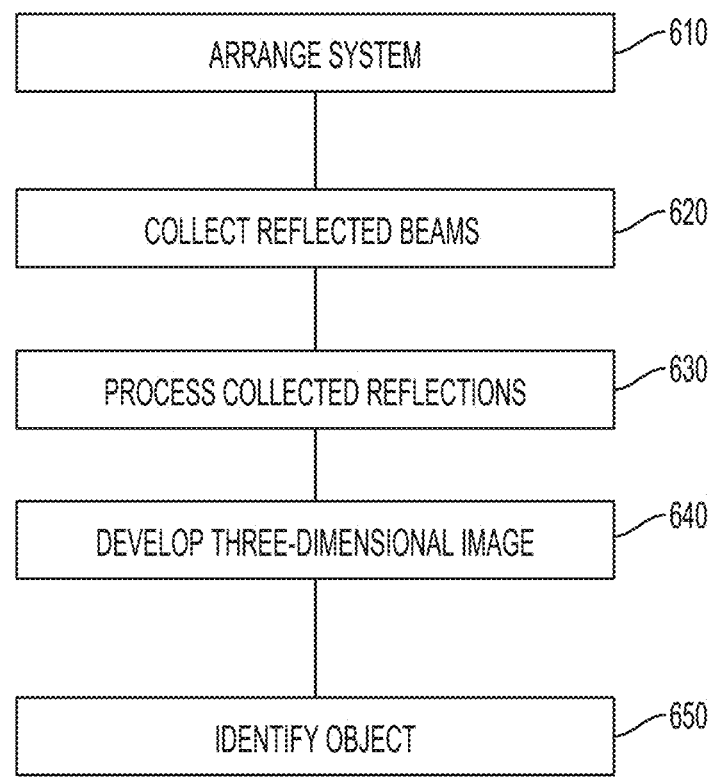
FIG. 6 is a process flow of a method of detecting a sub-seabed object according to embodiments of the invention.

FIG. 6 is a process flow of a method of detecting a sub-seabed object 150 according to embodiments of the invention. At block 610, arranging the system 100 includes arranging one or more moving platforms 140 that include the low frequency signal source 110 and one or more vibrometers 120. Collecting reflected beams, at block 620, includes receiving (with each of the receivers 124 of each vibrometer 120) an indication of scattered acoustic energy based on the transmitted (laser) beams (transmitted by the transmitter 122 of each vibrometer 120). Processing the collected (laser) reflections at block 630 includes coherently combining the reflected beam recorded by each receiver 124 of each vibrometer 120 for each given point (phase center 310) (resulting from each of the acoustic transmissions as the platform 140 moves along a defined track). At block 640, developing the three-dimensional image refers to the results of the coherent combinations which provides an enhanced indication of reflected acoustic energy from points on and below the seabed. Identifying the object 150, at block 650, refers to using the three-dimensional image to identify areas where the reflections are different than at other areas. The general shape (e.g., rectangular, spherical) would help to discern a man-made object 150 (e.g., landmine, artifact, black box from an aircraft) from a natural sub-seabed formation. The three-dimensional image resulting from the vibrometer 120 measurements may be presented to an operator in any known format. That is, the three-dimensional image may be rotated, viewed top-down, front-to-back, and in selected slices, for example. The three-dimensional data may additionally be used by any known target detection or image processing technique to automatically identify an object 150. For example, all areas with reflection values within defined thresholds may be identified.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A buried object detection system configured to detect an object buried beneath a seabed, the system comprising:
    a moving platform;
    a low frequency signal source coupled to the platform and configured to transmit a low frequency signal to an area of the seabed at each position of a plurality of positions of the platform;
    a multi-beam laser Doppler vibrometer (LDV) coupled to the platform and configured to transmit a plurality of transmission beams to the area of the seabed at a respective plurality of angles at each position of the plurality of positions of the platform over the area, the LDV comprising a plurality of receivers that receive a respective plurality of reflection beams resulting from the plurality of transmission beams; and
    a processor configured to process the plurality of reflection beams to develop a three-dimensional image that indicates the object, the processor determining a reflection value at each point of the three-dimensional image as a coherent combination of reflections from the point contributing to each of the plurality of reflection beams, wherein the plurality of transmission beams defines, for the LDV, a coverage area within the area associated with the low frequency signal at a given position of the plurality of positions of the platform and the coverage area associated with a first positon of the plurality of positions of the platform overlaps with the coverage area associated with a second positon of the plurality of positions of the platform.

2. The system according to claim 1, wherein the low frequency signal source is a transducer that transmits the low frequency signal to be between 1 and 10 kilohertz.

3. The system according to claim 1, wherein the plurality of transmission beams at the respective plurality of angles at each position of the plurality of positions of the platform are perpendicular to a direction of travel of the platform.

4. The system according to claim 1, wherein the LDV includes a plurality of mirrors configured to move the plurality of transmission beams to a respective plurality of beam positions for each position of the plurality of positions of the platform, the processor obtaining the coherent combination of reflections based additionally on reflections from the plurality of beam positions.

5. The system according to claim 4, wherein the plurality of beam positions associated with a given one of the plurality of transmission beams is parallel to a direction of travel of the platform.

6. The system according to claim 1, wherein the LDV generates reflections from the coverage area associated with each positon of the plurality of positions of the platform.

7. The system according to claim 1, wherein the processor determines a relative position of each point of the three-dimensional image based on the overlap.

8. The system according to claim 1, wherein, based on the coherent combination, a resolution of each point of the three-dimensional image is 10 centimeters or less.

9. The system according to claim 1, further comprising another of the LDV coupled to the platform, wherein the processor determines the coherent combination based on the respective plurality of reflection beams received by both of the LDVs.

10. The system according to claim 1, wherein the processor is coupled to the platform.

11. A method of detecting an object buried beneath a seabed, the method comprising:
    arranging a system to move above an area of the seabed, the system comprising a platform coupled to a low frequency signal source transmitting a low frequency signal to the area of the seabed at each position of a plurality of positions of the platform and a laser Doppler vibrometer (LDV);
    transmitting, using the LDV, a plurality of transmission beams to the area of the seabed at a respective plurality of angles at each position of the plurality of positions of the platform over the area, wherein the transmitting the plurality of transmission beams, for the LDV, a coverage area within the area associated with the low frequency signal at a given position of the plurality of positions of the platform;
    collecting a respective plurality of reflection beams resulting from the plurality of transmission beams;
    processing the plurality of reflection beams and developing a three-dimensional image of the area based on determining a reflection value at each point of the three-dimensional image as a coherent combination of reflections from the point contributing to each of the plurality of reflection beams;
    moving the platform to define another coverage area that has an overlap with the coverage area and determining a relative position of each point of the three-dimensional image based on the overlap; and
    identifying the object based on the three-dimensional image.

12. The method according to claim 11, wherein the transmitting the plurality of transmission beams includes transmitting the plurality of transmission beams at the respective plurality of angles at each position of the plurality of positions of the platform to be perpendicular to a direction of travel of the platform.

13. The method according to claim 11, further comprising moving, using a plurality of mirrors of the LDV, the plurality of transmission beams to a respective plurality of beam positions for each position of the plurality of positions of the platform, wherein the processing includes obtaining the coherent combination of reflections based additionally on reflections from the plurality of beam positions.

14. The method according to claim 13, wherein the moving the plurality of transmission beams to the respective plurality of beam positions includes moving each of the plurality of transmission beams in a direction parallel to a direction of travel of the platform.

15. The method according to claim 11, further comprising controlling a speed and direction of the platform.

16. The method according to claim 11, wherein the arranging the system includes coupling another LDV to the platform.

* * * * *